United States Patent
Hu et al.

(10) Patent No.: US 10,178,561 B2
(45) Date of Patent: Jan. 8, 2019

(54) ENHANCING DATA PERFORMANCE IN MULTI-SUBSCRIBER IDENTITY MODULE (SIM) WIRELESS COMMUNICATION DEVICES

(71) Applicant: QUALCOMM Incorporated, San Diego, CA (US)

(72) Inventors: Jun Hu, San Diego, CA (US); Qingxin Chen, San Diego, CA (US); Reza Shahidi, San Diego, CA (US); Yongsheng Shi, San Diego, CA (US); Jafar Mohseni, San Diego, CA (US); Yongle Wu, San Diego, CA (US); Yong Li, San Diego, CA (US); Shashank Maiya, Milpitas, CA (US); Harish Venkatachari, Sunnyvale, CA (US); Shriram Swaminathan, Sunnyvale, CA (US); Scott Hoover, Del Mar, CA (US); Sumit Kumar Singh, San Diego, CA (US); Kiran Patil, San Diego, CA (US); Zhong Fan, San Diego, CA (US); Uzma Khan Qazi, San Marcos, CA (US); Sundaresan Tambaram Kailasam, San Diego, CA (US); Sunil Kumar Gurram, San Marcos, CA (US)

(73) Assignee: QUALCOMM Incorporation, San Diego, CA (US)

( * ) Notice: Subject to any disclaimer, the term of this patent is extended or adjusted under 35 U.S.C. 154(b) by 13 days.

(21) Appl. No.: 15/442,429

(22) Filed: Feb. 24, 2017

(65) Prior Publication Data
US 2018/0249349 A1      Aug. 30, 2018

(51) Int. Cl.
*H04W 4/00*     (2018.01)
*H04W 24/02*    (2009.01)
(Continued)

(52) U.S. Cl.
CPC .......... *H04W 24/02* (2013.01); *H04W 76/28* (2018.02); *H04W 88/06* (2013.01); *H04W 84/042* (2013.01)

(58) Field of Classification Search
None
See application file for complete search history.

(56) References Cited

U.S. PATENT DOCUMENTS

2015/0141017 A1* 5/2015 Krishnamoorthy ........................ H04W 36/0066 455/437
2015/0289141 A1* 10/2015 Ghasemzadeh ....... H04W 16/14 370/330

(Continued)

FOREIGN PATENT DOCUMENTS

| WO | WO-2016179162 A1 | 11/2016 |
|---|---|---|
| WO | WO-2017004147 A1 | 1/2017 |

OTHER PUBLICATIONS

International Search Report and Written Opinion—PCT/US2018/014028—ISA/EPO—dated Apr. 20, 2018.

*Primary Examiner* — Anh Vu H Ly
(74) *Attorney, Agent, or Firm* — Paradice and Li LLP

(57) ABSTRACT

Examples described herein relate to enhancing data communication performance in a wireless communication network including a first subscription associated with a first radio access technology (RAT) and a second subscription associated with a second RAT, where the wireless communication device uses a same radio frequency (RF) resource to communicate over both the first RAT and the second RAT. The first RAT is used, in part, for data operations while the second RAT is used, in part, for voice operations. During idle state voice operations, the RF resource is reallocated from performing data operations to performing idle state voice operations, causing interruptions in the data opera- (Continued)

tions. The wireless communication device adjusts at least one or a duration and an occurrence of the idle state voice operations to reduce the impact on the data operations.

20 Claims, 7 Drawing Sheets

(51) Int. Cl.
*H04W 76/28* (2018.01)
*H04W 88/06* (2009.01)
*H04W 84/04* (2009.01)

(56) References Cited

U.S. PATENT DOCUMENTS

| | | | |
|---|---|---|---|
| 2015/0304989 A1* | 10/2015 | Zhu | H04W 36/0066 370/252 |
| 2015/0327159 A1* | 11/2015 | Gude | H04W 48/18 455/434 |
| 2015/0334578 A1* | 11/2015 | Movva | H04W 24/02 370/241 |
| 2015/0373667 A1* | 12/2015 | Rajurkar | H04W 48/16 455/458 |
| 2016/0050590 A1* | 2/2016 | Ponukumati | H04B 17/309 455/437 |
| 2016/0095087 A1* | 3/2016 | Mohseni | H04W 72/02 455/558 |
| 2016/0119860 A1* | 4/2016 | Chawla | H04W 48/16 455/434 |
| 2016/0295439 A1* | 10/2016 | Yang | H04W 24/10 370/389 |
| 2016/0353516 A1* | 12/2016 | Rajurkar | H04W 8/183 370/328 |
| 2016/0366627 A1* | 12/2016 | Yang | H04W 36/14 370/389 |
| 2016/0381710 A1 | 12/2016 | Bansal et al. | |
| 2017/0019819 A1* | 1/2017 | Yang | H04B 7/1855 370/389 |
| 2017/0041976 A1* | 2/2017 | Van | H04W 76/18 370/328 |
| 2017/0064598 A1* | 3/2017 | Jain | H04W 36/14 370/389 |
| 2017/0208603 A1* | 7/2017 | Goel | H04W 36/14 370/389 |
| 2017/0280473 A1* | 9/2017 | Krishnamoorthy | H04W 72/1231 370/389 |
| 2017/0290086 A1* | 10/2017 | Patel | H04W 8/183 370/389 |

* cited by examiner

ENHANCING DATA PERFORMANCE IN MULTI-SUBSCRIBER IDENTITY MODULE (SIM) WIRELESS COMMUNICATION DEVICES

BACKGROUND

A wireless communication device, such as a mobile phone device or a smart phone, may include two or more Subscriber Identity Modules (SIMs). Each SIM may correspond to at least one subscription via a Radio Access Technology (RAT). Such a wireless communication device may be a multi-SIM wireless communication device. In a Multi-SIM-Multi-Active (MSMA) wireless communication device, all SIMs may be active at the same time. In a Multi-SIM-Multi-Standby (MSMS) wireless communication device, if any one SIM is active, then the rest of the SIM(s) may be in a standby mode. The RATs may include, but are not limited to, Frequency Division Multiple Access (FDMA), Time Division Multiple Access (TDMA), Code Division Multiple Access (CDMA) (particularly, Evolution-Data Optimized (EVDO)), Universal Mobile Telecommunications Systems (UMTS) (particularly, Time Division Synchronous CDMA (TD-SCDMA or TDS), Wideband Code Division Multiple Access (WCDMA), Long Term Evolution (LTE), evolved Multimedia Broadcast Multicast Services (eMBMS), High-Speed Downlink Packet Access (HSDPA), and the like), evolved High Rate Packet Data (eHRPD), Global System for Mobile Communications (GSM), Code Division Multiple Access 1× Radio Transmission Technology (1×), General Packet Radio Service (GPRS), Wi-Fi, Personal Communications Service (PCS), and other protocols that may be used in a wireless communications network or a data communications network.

The wireless communication device may use one SIM to engage in active data exchange for a data call and/or a data session, while using a second SIM for voice calls. In some instances, voice call operations, even when no active voice call is present, may interrupt data exchange.

SUMMARY

Examples described herein relate to apparatuses and methods for optimizing Inter-Radio Access Technology (IRAT) and inter-frequency ("inter-f") performance of a wireless communication device having a first Subscriber Identity Module (SIM) associated with a first subscription via a first Radio Access Technology (RAT) and a second SIM associated with a second subscription via a second RAT. The first SIM may be engaged in data operations, while the second SIM may be engaged in voice operations. Data operations can include transmit and receive operations carried out by the wireless communication device when engaging in data exchange for a data call and/or a data session. Voice operations can include transmit or receive operations carried out by the wireless communication device when in a voice call. Voice operations also may include idle state voice operations engaged when the second SIM is in an idle mode. The first subscription and the second subscription may share a Radio Frequency (RF) resource, for example, in a Multi-SIM-Multi-Standby (MSMS) wireless communication device.

In some examples, large amount of inter-f/IRAT search and measurement activities can occur on the voice operations. This may cause long tuneaway gaps in the data operations when on a data call. These tuneaways can have significant impact on the data performance. In some example implementations, the voice operations can have lower channel quality requirements. Further there is no significant difference between different RATs serving voice operations. Further data calls can be of a relatively short duration.

In some example implementations, techniques for optimizing inter-f/IRAT performance may be triggered only when all of the following conditions are met: the first SIM is in a data call, the second SIM is dedicated to a voice call, and the cell serving the voice call is in reasonable channel conditions.

In some example implementations, the optimizing techniques can include slowing down of the periodicity of the inter-f/IRAT search and measurement. Another technique can include limiting a number of inter-f/IRAT activities in each Discontinuous Reception ("DRX") cycle. Another technique can include skipping IRAT measurements in good channel conditions. An additional technique can include skipping IRAT reselection in good channel conditions. In yet another technique priority of inter-f/IRAT frequencies can be changed. Another technique can include prioritizing the serving RAT over other RATs. Yet another technique can include separating out inter-f/IRAT activities from other idle activities to allow good recovery of data SIM operations. In another technique, a fast search/measurement on serving RAT can carried out before reselection to a different RAT. In yet another technique, search/measurement thresholds can be changed.

According to various examples, a method for implementing techniques to improve data communications in a wireless communication device includes detecting a data operation over a first radio access technology (RAT) network associated with a first subscriber identity module (SIM). The method further includes detecting one or more idle status voice operations over a second RAT network associated with a second SIM, where the data operation and the one or more idle status voice operations share a radio frequency (RF) resource. The method also includes responsive to detecting the data operation and the idle status voice operation, adjusting at least one of a duration and an occurrence of the one or more idle status voice operations.

In some examples, the method further includes monitoring a paging channel of a serving cell in the second RAT network to detect a predetermined channel condition, and where adjusting at least one of a duration and an occurrence of the one or more idle status voice operations is additionally responsive to detecting the predetermined channel condition.

In some examples, the method further includes reallocating the RF resource from performing the data operation to performing the at least one idle status voice operation in response to detecting the one or more idle status voice operations.

In some examples, adjusting at least one of a duration and an occurrence of the one or more idle status voice operations includes decreasing a repetition rate of a cell measurement operation.

In some examples, adjusting at least one of a duration and an occurrence of the one or more idle status voice operations includes decreasing a number of the one or more idle status voice operations during a discontinuous reception (DRX) cycle.

In some examples, adjusting at least one of a duration and an occurrence of the one or more idle status voice operations includes reducing a total duration of the one or more idle status voice operations during a discontinuous reception (DRX) cycle.

In some examples, adjusting at least one of a duration and an occurrence of the one or more idle status voice operations is based on types of the one or more idle status voice operations being carried out during a discontinuous (DRX) cycle.

In some examples, adjusting at least one of a duration and an occurrence of the one or more idle status voice operations includes skipping cell measurement operations if a serving cell provides a predetermined channel condition.

In some examples, adjusting at least one of a duration and an occurrence of the one or more idle status voice operations includes skipping cell reselection operations to a different RAT network from the second RAT network if a serving cell provides a predetermined channel condition.

In some examples, adjusting at least one of a duration and an occurrence of the one or more idle status voice operations includes adjusting a reselection priority level associated with a serving cell frequency to be greater than or equal to a reselection priority associated with a neighboring cell frequency.

In some examples, adjusting at least one of a duration and an occurrence of the one or more idle status voice operations includes increasing reselection priorities of all frequencies in a serving RAT to be greater than or equal to a reselection priority of any frequency of a non-serving RAT.

In some examples, adjusting at least one of a duration and an occurrence of the one or more idle status voice operations includes performing a search for suitable frequencies within a serving RAT prior to switching to a neighboring cell in a RAT network that is different from the second RAT network.

In some examples, adjusting at least one of a duration and an occurrence of the one or more idle status voice operations includes reducing a signal strength measurement threshold with which a signal strength of a serving cell frequency is compared during a cell measurement operation.

In some examples, adjusting at least one of a duration and an occurrence of the one or more idle status voice operations includes performing at least one of a cell measurement operation and a cell selection operation during a discontinuous reception cycle (DRX) separately from other idle state voice operations.

According to examples, a wireless communication device includes a radio frequency (RF) resource and a processor communicably coupled to the RF resource. The RF resource is capable of supporting a data operation over a first radio access technology (RAT) network associated with a first subscriber identity module (SIM), and of supporting one or more idle status voice operations over a second RAT network associated with a second SIM. The processor is adapted to detect the data operation over the first RAT network. The processor is further adapted to detect the one or more idle status voice operation over the second RAT network. The processor is also adapted to responsive to detecting the data operation and the one or more idle status voice operations, adjust at least one of a duration and an occurrence of the one or more idle status voice operations.

In some examples, the processor is further adapted to monitor a paging channel of a serving cell in the second RAT network to detect a predetermined channel condition, and to adjust at least one of a duration and an occurrence of the one or more idle status voice operations additionally responsive to detecting the predetermined channel condition.

In some examples, the processor is further adapted to reallocate the RF resource from performing the data operation to performing the at least one idle status voice operation in response to detecting the one or more idle status voice operations.

In some examples, the processor is adapted to adjust at least one of a duration and an occurrence of the one or more idle status voice operations by decreasing a repetition rate of a cell measurement operation.

In some examples, the processor is adapted to adjust at least one of a duration and an occurrence of the one or more idle status voice operations by decreasing a number of the one or more idle status voice operations during a discontinuous reception (DRX) cycle.

In some examples, the processor is adapted to adjust at least one of a duration and an occurrence of the one or more idle status voice operations by reducing a total duration of the one or more idle status voice operations during a discontinuous reception (DRX) cycle.

In some examples, the processor is adapted to adjust at least one of a duration and an occurrence of the one or more idle status voice operations based on types of the one or more idle status voice operations being carried out during a discontinuous (DRX) cycle.

In some examples, the processor is adapted to adjust at least one of a duration and an occurrence of the one or more idle status voice operations by skipping cell measurement operations if a serving cell provides a predetermined channel condition.

In some examples, the processor is adapted to adjust at least one of a duration and an occurrence of the one or more idle status voice operations by skipping cell reselection operations to a different RAT network from the second RAT network if a serving cell provides a predetermined channel condition.

In some examples, the processor is adapted to adjust at least one of a duration and an occurrence of the one or more idle status voice operations by adjusting a reselection priority level associated with a serving cell frequency to be greater than or equal to a reselection priority associated with a neighboring cell frequency.

In some examples, the processor is adapted to adjust at least one of a duration and an occurrence of the one or more idle status voice operations by increasing reselection priorities of all frequencies in a serving RAT to be greater than or equal to a reselection priority of any frequency of a non-serving RAT.

In some examples, the processor is adapted to adjust at least one of a duration and an occurrence of the one or more idle status voice operations by performing a search for suitable frequencies within a serving cell prior to switching to a neighboring cell in a RAT network that is different from the second RAT network.

In some examples, the processor is adapted to adjust at least one of a duration and an occurrence of the one or more idle status voice operations by reducing a signal strength measurement threshold with which a signal strength of a serving cell frequency is compared during a cell measurement operation.

According to examples, a non-transitory computer readable medium includes program instructions which when executed cause a computer to detect a data operation over a first radio access technology (RAT) network associated with a first subscriber identity module (SIM). The instructions which when executed further cause the computer to detect one or more idle status voice operations over a second RAT network associated with a second SIM, where the data operation and the one or more idle status voice operations share a radio frequency (RF) resource. The instructions which when executed also cause the computer to responsive to detecting the data operation and the idle status voice operation, adjust at least one of a duration and an occurrence of the one or more idle status voice operations.

According to examples, a wireless communication device includes radio frequency means capable of supporting a data operation over a first radio access technology (RAT) network associated with a first subscriber identity module (SIM), and of supporting one or more idle status voice operations over a second RAT network associated with a second SIM. The wireless communication device further includes data operation detecting means for detecting the data operation over the first RAT network. The wireless communication device also includes idle status voice operation detecting means for detecting the one or more idle status voice operations over the second RAT network.

BRIEF DESCRIPTION OF THE DRAWINGS

The accompanying drawings, which are incorporated herein and constitute part of this specification, illustrate exemplary examples of the disclosure, and together with the general description given above and the detailed description given below, serve to explain the features of the various examples.

DETAILED DESCRIPTION

Figure 1:
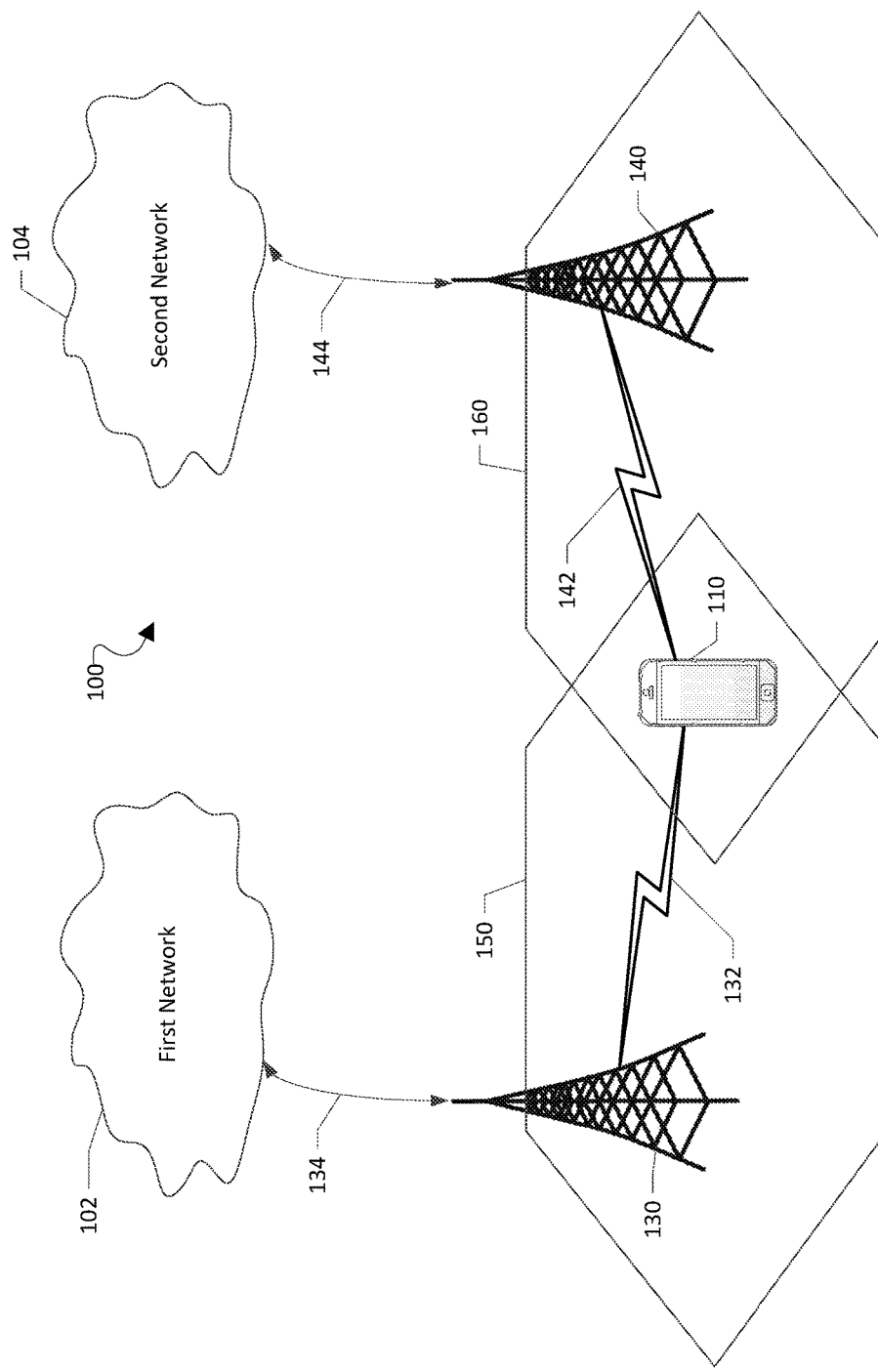
FIG. 1 is a schematic diagram of a communication system in accordance with various examples.

Various examples will be described in detail with reference to the accompanying drawings. Wherever possible, the same reference numbers may be used throughout the drawings to refer to the same or like parts. Different reference numbers may be used to refer to different, same, or similar parts. References made to particular examples and implementations are for illustrative purposes, and are not intended to limit the scope of the disclosure or the claims.

Some modern communication devices, referred to herein as a wireless communication device, User Equipment (UE), or Mobile Station (MS), may include any one or all of cellular telephones, smart phones, personal or mobile multimedia players, personal data assistants, laptop computers, personal computers, tablet computers, smart books, palmtop computers, wireless electronic mail receivers, multimedia Internet-enabled cellular telephones, wireless gaming controllers, appliances, automobiles, and similar personal electronic devices. Such a wireless communication device may include at least one Subscriber Identity Module (SIM), a programmable processor, memory, and circuitry for connecting to two or more mobile communication networks.

A wireless communication device may include one or more SIMs that provide users of the wireless communication devices with access to one or multiple separate mobile communication networks. The mobile communication networks may be supported by Radio Access Technologies (RATs). The wireless communication device may be configured to connect to one or more base stations via one or more RATs. Examples of RATs may include, but not limited to, Frequency Division Multiple Access (FDMA), Time Division Multiple Access (TDMA), Code Division Multiple Access (CDMA) (particularly, Evolution-Data Optimized (EVDO)), Universal Mobile Telecommunications Systems (UMTS) (particularly, Time Division Synchronous CDMA (TD-SCDMA or TDS), Wideband Code Division Multiple Access (WCDMA), Long Term Evolution (LTE), evolved Multimedia Broadcast Multicast Services (eMBMS), High-Speed Downlink Packet Access (HSDPA), and the like), evolved High Rate Packet Data (eHRPD), Global System for Mobile Communications (GSM), Code Division Multiple Access 1× Radio Transmission Technology (1×), General Packet Radio Service (GPRS), Wi-Fi, Personal Communications Service (PCS), and other protocols that may be used in a wireless communications network or a data communications network. Each RAT may be associated with a subscription or SIM.

A wireless communication device provided with a plurality of SIMs and connected to two or more subscriptions or networks with one subscription or network being active at a given time is a Multi-SIM-Multi-Standby (MSMS) communication device. In one example, the MSMS communication device may be a Dual-SIM-Dual-Standby (DSDS) communication device, which may include two SIMs that may both be active on standby, but one is deactivated when the other one is in use. In another example, the MSMS communication device may be a Triple-SIM-Triple-Standby (TSTS) communication device, which includes three SIMs that may all be active on standby, where two may be deactivated when the third one is in use. In other examples, the MSMS communication device may be other suitable multi-SIM communication devices, with, for example, four or more SIMs, such that when one is in use, the others may be deactivated.

On the other hand, a wireless communication device that includes a plurality of SIMs and connects to two or more subscriptions or networks with two or more subscriptions or networks being active at a given time may be a MSMA communication device. An example MSMA communication device may be a Dual-SIM-Dual-Active (DSDA) communication device, which may include two SIMs. Both SIMs may remain active. In another example, the MSMA device may be a Triple-SIM-Triple-Active (TSTA) communication device, which may include three SIMs. All three SIMs may remain active. In other examples, the MSMA communication device may be other suitable multi-SIM communication devices with four or more SIMs, all of which may be active.

Generally, examples described herein may be applicable to a wireless communication device having a shared Radio Frequency (RF) resource, and/or a MSMS wireless communication device having at least a first SIM and a second SIM. Illustrating with a non-limiting example, the first SIM may be associated with a first subscription via a first RAT, and the second SIM may be associated with a second subscription via a second RAT. The first SIM may be capable of carrying out data operations, while the second SIM may be capable of carrying out voice operations. The examples may also be applicable to a MSMA wireless communication device that suspends first subscription communication activities due to blanking pattern, power back-off, interference, and/or the like when the second subscription receives page or other types of communications, vice versa.

As used herein, the terms "SIM," "SIM card," and "subscriber identification module" may be used interchangeably to refer to a memory that may be an integrated circuit or embedded into a removable card, and that stores an International Mobile Subscriber Identity (IMSI), related key, and/or other information used to identify and/or authenticate a wireless device on a network and enable communication services with the network. Because the information stored in a SIM may be used by the wireless device for establishing a communication link for a particular communication service with a particular network, the term "SIM" may also be used herein as a shorthand reference to the communication service (e.g., the networks, the subscriptions, the services, and/or the like) associated with and enabled by the information (e.g., in the form of various parameters) stored in a particular SIM as the SIM and the communication network, as well as the services and RATs supported by that network, correlate to one another.

When the wireless communication device is engaged in a data call and/or a data session, voice operations may undesirably disrupt data operations associated with the data call and/or the data session. The voice operations can include inter-f and IRAT operations, which can be carried out even when the second SIM is operating in an idle mode. Inter-f operations include search and measurements of other frequencies provided within the serving cell or a neighboring cell. IRAT operations can include search and measurement of other RATs other than the one currently serving the voice call.

IRAT and Inter-f communications carried out on behalf of one SIM may disrupt communications carried out on behalf of another SIM. In particular, in a multi-SIM wireless communication device, various RATs may share a single RF chain or resource to transmit and receive communications. For instance, the single RF chain may be capable of operation on any one of a first RAT subscribed by a first SIM and a second RAT subscribed by a second SIM. The first RAT (e.g., LTE, eHRPD, and/or the like) may be used for data applications while the second RAT (e.g., 1×, GSM, and/or the like) may be used for voice applications. Even if the second SIM is idle (e.g., is not on a voice call), it may repeatedly communicate over the second RAT to implement various functions such as page monitoring, cell measurements, cell selection, cell reselection, acquire system information, etc. In some instances, each time the communications over the second RAT are requested, the RF chain is tuned away from operating in the second RAT to operating in the second RAT. This is particularly common where voice communication is given priority over data communications. However, the repeated de-allocation of the RF chain from the first RAT that communicates data to the second RAT for carrying out idle status functions, can undesirably disrupt the data communication over the first RAT. The following discuss various examples to reduce this disruption of data communication.

Various examples may be implemented within a communication system 100, an example of which is illustrated in FIG. 1. Referring to FIG. 1, a first mobile network 102 and a second mobile network 104 may each be associated with a plurality of cellular base stations. For instance, a first base station 130 may be associated with the first mobile network 102. A second base station 140 may be associated with the second mobile network 104. The first base station 130 may be broadcasting to the first mobile network 102 in a first serving cell 150. The second base station 140 may be broadcasting to the second mobile network 104 in a second serving cell 160. A wireless communication device 110 may be associated with (within effective boundaries of) the first serving cell 150 and the second serving cell 160.

The first base station 130 may be in communication with the first mobile network 102 over a wired or wireless connection 134. The second base station 140 may be in communication with the second mobile network 104 over a wired or wireless connection 144.

The wireless communication device 110 may be in communication with the first mobile network 102 through a first cellular connection 132 to the first base station 130. The first cellular connection 132 may correspond to the first RAT on a first subscription (using a first SIM 204a shown in FIG. 2) of the wireless communication device 110. The wireless communication device 110 may be in communication with the second mobile network 104 through a second cellular connection 142 to the second base station 140. The second cellular connection 142 may correspond to the second RAT on a second subscription (using a second SIM 204b shown in FIG. 2) of the wireless communication device 110. It shall be understood that the configuration of FIG. 1 is for illustration only, not for limitation. In other configurations, the wireless communication device 110 may communicate with more (e.g., 4, 5, 6, etc.) mobile networks via more RATs.

The first cellular connection 132 and second cellular connection 142 may each be made through two-way wireless communication links. Examples of each of the first RAT and the second RAT may include, but not limited to, FDMA, TDMA, CDMA (e.g., EVDO), UMTS (e.g., TDS, WCDMA, LTE, eMBMS, HSDPA, or the like), GSM, 1×, GPRS, Wi-Fi, PCS, and/or another protocol used in a wireless communications network or a data communications network. By way of illustrating with a non-limiting example, the first RAT (employed by the cellular connection 132) may be LTE, WCDMA, TDS, GSM, 1×, EVDO, or another suitable RAT. The second RAT (employed by the second cellular connection 142) may be LTE, WCDMA, GSM, 1×, or another suitable RAT.

Each of the first base station 130 and the second base station 140 may include at least one antenna group or transmission station located in the same or different areas. The at least one antenna group or transmission station may be associated with signal transmission and reception. Each base station 130 or 140 may include one or more processors, modulators, multiplexers, demodulators, demultiplexers, antennas, and the like for performing the functions described herein. In some examples, each base station 130 or 140 may be an access point, Node B, evolved Node B (eNodeB or eNB), base transceiver station (BTS), or the like.

In various examples, the wireless communication device 110 may be configured to access the first mobile network 102 and the second mobile network 104 by virtue of the multi-SIM and/or the multi-mode SIM configuration of the wireless communication device 110. When a SIM corresponding to a RAT is inserted, the wireless communication device 110 may access the mobile communication network associated with that RAT based on the information stored on the SIM through registrations and call setups.

In some examples, the wireless communication device 110 may establish a wireless connection with a peripheral device (not shown) used in connection with the wireless communication device 110. For example, the wireless communication device 110 may communicate over a Bluetooth® link with a Bluetooth-enabled personal computing device (e.g., a "smart watch"). In some examples, the wireless communication device 110 may establish a wireless connection with a wireless access point (not shown), such as over a Wi-Fi connection. The wireless access point may be configured to connect to the Internet or another network over a wired connection.

Figure 2:
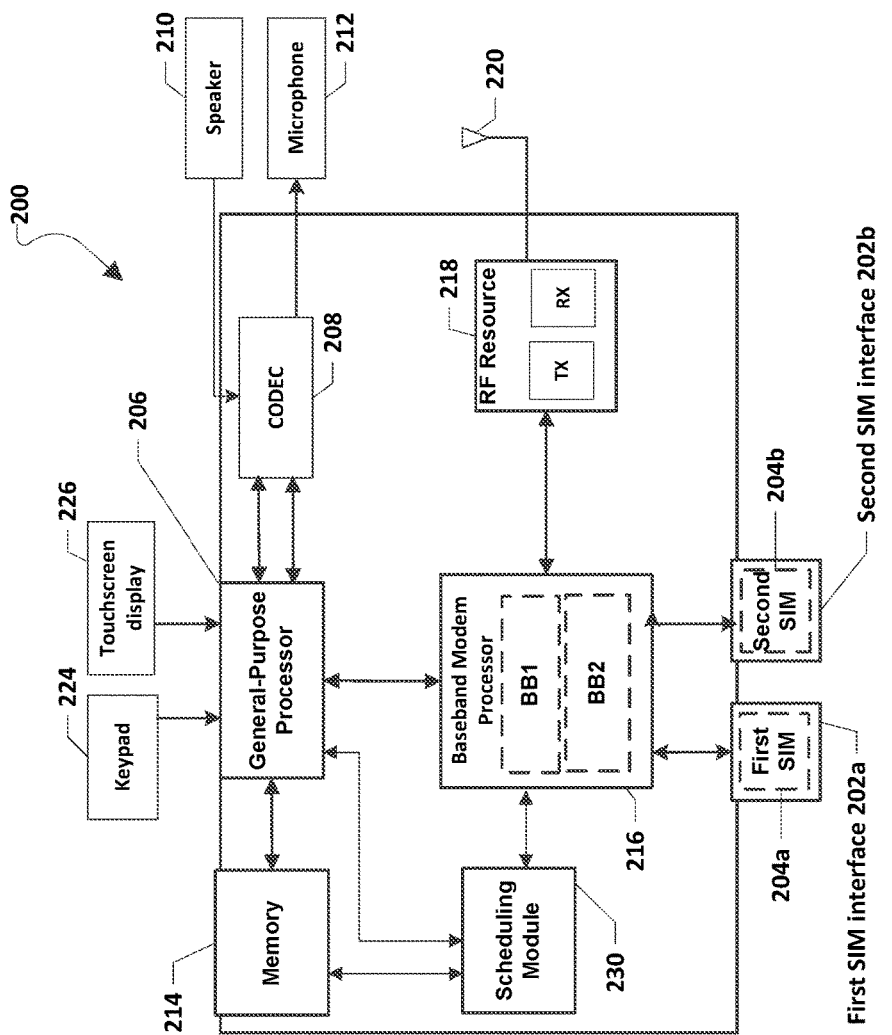
FIG. 2 is a component block diagram of a wireless communication device according to various examples.

FIG. 2 is a functional block diagram of a wireless communication device 200 suitable for implementing various examples. According to various examples, the wireless communication device 200 may be the wireless communication device 110 as described with reference to FIG. 1. Referring to FIGS. 1-2, the wireless communication device 200 may include a first SIM interface 202a, which may receive a first identity module SIM-1 204a (the first SIM) that is associated with the first mobile network 102 via a first RAT. The wireless communication device 200 may also include a second SIM interface 202b, which may receive a second identity module SIM-2 204b (the second SIM) that is associated with the second mobile network 104 via a second RAT. Although two SIM interfaces/modules are shown in FIG. 2 for the simplicity of illustration, it should be understood that the wireless communication device 200 may include more than two SIM interfaces/modules.

A SIM (e.g., SIM-1 204a, SIM-2 204b, and/or the like) in various examples may be a Universal Integrated Circuit Card (UICC) that is configured with SIM and/or Universal SIM (USIM) applications, enabling access to GSM and/or UMTS networks. The UICC may also provide storage for a phone book and other applications. Alternatively, in a CDMA network, a SIM may be a UICC removable user identity module (R-UIM) or a CDMA Subscriber Identity Module (CSIM) on a card. A SIM card may have a Central Processing Unit (CPU), Read Only Memory (ROM), Random Access Memory (RAM), Electrically Erasable Programmable Read-Only Memory (EEPROM) and Input/Output I/O) circuits. An Integrated Circuit Card Identity (ICCID) SIM serial number may be printed on the SIM card for identification. However, a SIM may be implemented within a portion of memory of the wireless communication device 200, and thus need not be a separate or removable circuit, chip, or card.

A SIM used in various examples may store user account information, an IMSI, a set of SIM Application Toolkit (SAT) commands, and other network provisioning information, as well as provide storage space for phone book database of the user's contacts. As part of the network provisioning information, a SIM may store home identifiers (e.g., a System Identification Number (SID)/Network Identification Number (NID) pair, a Home Public Land Mobile Network (HPLMN) code, etc.) to indicate the SIM card network operator provider.

The wireless communication device 200 may include at least one controller, such as a general-purpose processor 206, which may be coupled to a coder/decoder (CODEC) 208. The CODEC 208 may in turn be coupled to a speaker 210 and a microphone 212. The general-purpose processor 206 may also be coupled to at least one memory 214. The general-purpose processor 206 may include any suitable data processing device, such as a microprocessor. In the alternative, the general-purpose processor 206 may be any suitable electronic processor, controller, microcontroller, or state machine. The general-purpose processor 206 may also be implemented as a combination of computing devices (e.g., a combination of a Digital Signal Processor (DSP) and a microprocessor, a plurality of microprocessors, at least one microprocessor in conjunction with a DSP core, or any other such configuration).

The memory 214 may be a non-transitory processor-readable storage medium that stores processor-executable instructions. For example, the instructions may include routing communication data relating to the first or second subscription though a corresponding baseband-RF resource chain. The memory 214 may include any suitable internal or external device for storing software and data. Examples of the memory 214 may include, but are not limited to, RAM, ROM, floppy disks, hard disks, dongles or other Recomp Sensor Board (RSB) connected memory devices, or the like. The memory 214 may store an Operating System (OS), user application software, and/or executable instructions. The memory 214 may also store application data, such as an array data structure.

The general-purpose processor 206 and the memory 214 may each be coupled to baseband modem processor 216. The SIMs (e.g., the SIM-1 204a, the SIM-2 204b, and/or the like) in the wireless communication device 200 may be associated with at least one baseband-RF resource chain. A baseband-RF resource chain may include the baseband modem processor 216, which may perform baseband/modem functions for communications on the SIMs. In some embodiments, the baseband-RF resource chain may include physically or logically separate baseband processors (e.g., BB1, BB2), each performing baseband/modem functions for one SIM. For example, the baseband processor BB1 performs baseband/modem functions for the SIM-1 204a while BB2 for the SIM-2 204b.

The baseband modem processor 216 may include one or more amplifiers and radios, referred to generally herein as a RF resource 218 or RF chain. In operation, the RF resource 218 is capable of operation on any one of the several RATs, but does not enable operation on multiple RATs simultaneously. The examples described herein may be applicable to wireless communication devices in which the SIMs 204a and 204b share a common set of RF resource (particularly, the RF resource 218). Alternatively, examples described herein may be applicable to wireless communication devices in which each of the SIMs 204a and 204b has a separate RF resource, but activities of one of the SIMs 204a and 204b may be deactivated while the other one of the SIMs 204a and 204b is active.

The RF resource 218 may include at least one transceiver that performs transmit/receive functions for the associated SIMs 204a and 204b of the wireless communication device 200. The RF resource 218 may include separate transmit and receive circuitry, or may include a transceiver that combines transmitter and receiver functions. The RF resource 218 may be coupled to a wireless antenna 220. The RF resource 218 may also be coupled to the baseband modem processor 216.

In some examples, the general-purpose processor 206, the memory 214, the baseband modem processor 216, and the RF resource 218 may be included in the wireless communication device 200 as a system-on-chip. In some examples, the SIMs 204a and 204b and their corresponding interfaces 202a, 202b may be external to the system-on-chip. Further, various input and output devices may be coupled to components on the system-on-chip, such as interfaces or controllers. Example user input components suitable for use in the wireless communication device 200 may include, but are not limited to, a keypad 224, a touchscreen display 226, and the microphone 212.

In some examples, the keypad 224, the touchscreen display 226, the microphone 212, or a combination thereof, may perform the function of receiving a request to initiate an outgoing call. For example, the touchscreen display 226 may receive a selection of a contact from a contact list or receive a telephone number. In another example, either or both of the touchscreen display 226 and the microphone 212 may perform the function of receiving a request to initiate an outgoing call. For example, the touchscreen display 226 may receive a selection of a contact from a contact list or to receive a telephone number. As another example, the request to initiate the outgoing call may be in the form of a voice command received via the microphone 212. Interfaces may be provided between the various software modules and functions in the wireless communication device 200 to enable communication between them.

The wireless communication device 200 may include a scheduling module 230 configured to perform the functions described herein with respect to scheduling activities of the first subscription and the second subscription. The scheduling module 230 can aid in executing one or more mitigation techniques discussed below. The scheduling module 230 may communicate with the software layers corresponding to both the first subscription and the second subscription to obtain activities of the first subscription and the second subscription in advance. The scheduling module 230 can modify, add, remove, or reschedule one or more activities to implement various mitigation techniques discussed below to reduce the disruption of data communications on the wireless communication device.

In some embodiments, the scheduling module 230 may be implemented within the general-purpose processor 206. For example, the scheduling module 230 may be implemented as a software application stored within the memory 214 and executed by the general-purpose processor 206. Accordingly, such embodiments can be implemented with minimal additional hardware costs. However, other embodiments relate to systems and processes implemented with dedicated hardware specifically configured for performing operations described herein with respect to the scheduling module 230. For example, the scheduling module 230 may be implemented as a separate processing component (i.e., separate from the general-purpose processor 206). The scheduling module 230 may be coupled to the memory 214, the general-purpose processor 206, the baseband modem processor 216, and/or the RF resource 218 for performing the function described herein.

Hardware and/or software for the functions may be incorporated in the wireless communication device 200 during manufacturing, for example, as a part of a configuration of an original equipment manufacturer (OEM) of the wireless communication device 200. In further embodiments, such hardware and/or software may be added to the wireless communication device 200 post-manufacture, such as by installing one or more hardware devices and/or software applications onto the wireless communication device 200.

In some embodiments, the wireless communication device 200 may include, among other things, additional SIM cards, SIM interfaces, at least another RF resource associated with the additional SIM cards, and additional antennas for connecting to additional mobile networks.

Figure 3:
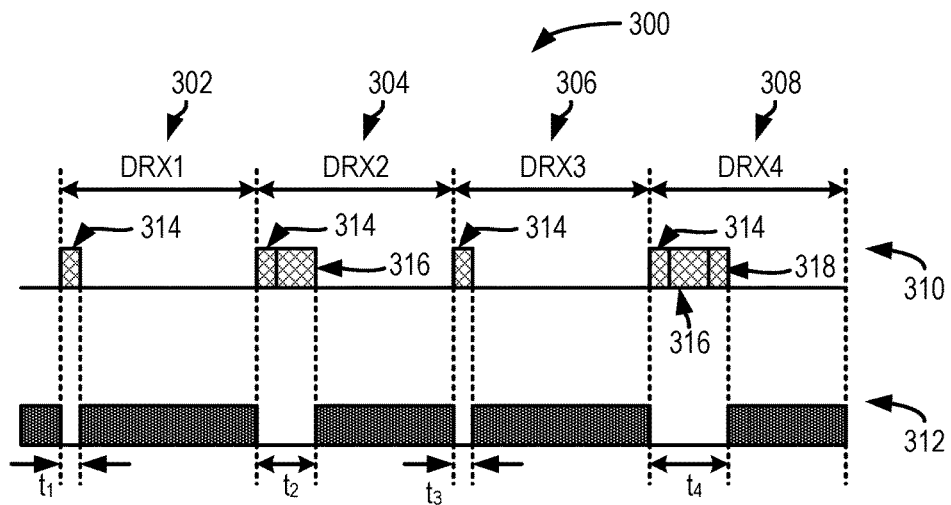
FIG. 3 shows a representation of example operations carried out by the wireless communication device shown in FIG. 2 according to various examples.

FIG. 3 shows a representation of example operations carried out by the wireless communication device 200 shown in FIG. 2. In particular, FIG. 3 shows an example set of voice SIM operations 310 and an example set of data SIM operations 312 carried out by the wireless communication device 200. The voice SIM operations 310 can represent the operations performed by the second SIM 204b, which is capable of carrying out voice operations, while the data SIM operations 312 can represent operations performed by the first SIM 204a, which is capable of carrying out data operations. In addition, the voice SIM operations 310 represent operations carried out when the associated SIM is in an idle mode. As discussed above, in the idle mode, the second SIM 204b may communicate over the second RAT to implement various functions such as page monitoring, cell measurements, cell selection and reselection, acquiring system information, etc. The data SIM operations 312 can include transmit and receive operations carried out by the wireless communication device 200 when engaging in a data call and/or in a data session. In some example implementations, the second SIM 204b may repeatedly carry out operations associated with one or more of these functions during repeated discontinuous reception (DRX) cycles. FIG. 3 shows a first DRX cycle 302, a second DRX cycle 304, a third DRX cycle 306 and a fourth DRX cycle 308. While FIG. 3 shows only four DRX cycles, it is understood that the second SIM 204b can implement a larger number of DRX cycles.

In some example implementations, each DRX cycle can have substantially the same duration. In some other example implementations, the DRX cycle duration may by varied by the second SIM 204b. For example, under LTE the DRX cycle can have a duration between 32 to 256 frames (i.e., about 0.32 s to about 2.56 s). A default DRX cycle duration can be specified by a base station in a system information block (SIB)-2 transmitted to the wireless communication device 200. However, the wireless communication device 200 can request a different DRX cycle duration during an attach request or during a tracking area update.

FIG. 3 shows the voice SIM operations 310 including page monitoring operations 314, cell measurement operations 316, cell reselection operations 318. It should be noted that FIG. 3 shows only a few example operations for sake of simplicity, and that in other example implementations additional operations also may be carried out. During the first DRX cycle 302, the voice SIM operations 310 include a page monitoring operation 314. Before the page monitoring operation 314 is executed, the RF chain (e.g, the RF resource 218 shown in FIG. 2) is allocated to the perform data SIM operations 312. However, at the beginning of the page monitoring operation 314, the RF chain is tuned away to perform the page monitoring operation 314. During the page monitoring operation 314, the wireless communication device 200 monitors a paging channel (PCH) for any messages transmitted by a base station associated with a currently serving cell. In one or more examples, the wireless communication device 200 may monitor for any incoming calls on the paging channel. After the page monitoring operation 314 is completed, the RF chain can be reallocated to perform data SIM operations 312. Due to the reallocation of the RF chain to the page monitoring operation 314, the data SIM operations 312 are interrupted for at least the duration $t_1$ of the page monitoring operation 314. In one or more examples, the duration $t_1$ also may include the time needed to switch the allocation of the RF chain between the data SIM operations 312 and the page monitoring operation 314.

Similar interruptions in the data SIM operations 312 occur in the other DRX cycles. For example, in the second DRX cycle 304, the data SIM operations 312 are interrupted for a duration $t_2$ due to the RF chain being tuned away to perform the page monitoring operation 314 and a cell measurement operation 316. During the cell measurement operation 316, the wireless communication device 200 measures the signal strength of the serving cell. In particular, the wireless communication device 200 measures the signal strength on one or more carrier frequencies specified for the serving cell. In one or more examples, the wireless communication device 200 also may measure the signal strength on one or more carrier frequencies of neighboring cells. In some such example implementations, signal strengths of the carrier frequencies of neighboring cells may be carried out only if the signal strength of the carrier frequencies of the serving cell fall below a threshold value. If the signal strengths of the carrier frequencies of the serving cell are above the threshold value, then the wireless communication device 200 may choose not to carry out cell reselection. As a result, after the cell measurement operation 316 is completed, the RF chain is reallocated to performing data SIM operations 312.

The third DRX cycle 306 includes only a page monitoring operation 314. Similar to that discussed above in relation to the first DRX cycle 302, the data SIM operations 312 are interrupted for a duration $t_3$ due to the RF chain being tuned away to perform the page monitoring operation 314. After the page monitoring operation 314 is completed, the RF chain is reallocated to perform the data SIM operations 312. In the fourth DRX cycle 308, the voice SIM operations 310 include a page monitoring operation 314, a cell measurement operation 316, and a cell reselection operation 318. Unlike the cell measurement operation 316 in the second DRX cycle 304, which did not result in a cell reselection, the cell measurement operation 316 in the fourth DRX cycle 308 leads to a cell reselection operation 318, in which the wireless communication device 200 may switch to a different frequency within the same RAT, or may switch to a different RAT altogether. Thus, the data SIM operations 312 are interrupted for a duration $t_4$ due to the RF chain being tuned away to perform the page monitoring operation 314, the cell measurement operation 316, and the cell reselection operation 318. Once these operations are completed, the RF chain can be reallocated to performing data SIM operations 312.

The interruptions in the data SIM operations 312 discussed above in relation to FIG. 3 can cause undesirable disruption in the data SIM operations 312. For example, in some example implementations, the interruptions may result in a degradation in an effective bandwidth of the data SIM operations 312. The degradation in the bandwidth may adversely affect high bandwidth applications such as audio and video applications. In some other example implementations, the interruptions may result in the wireless communication device 200 to be disconnected from the first RAT, over which the data SIM operations 312 are being communicated. The disconnection from the first RAT may be particularly caused by interruptions with long durations. In some such examples, the wireless communication device 200 may have to re-establish communication with the first RAT before resuming data SIM operations 312, thereby resulting in further reduction in the effective bandwidth of the data SIM operations 312.

In one or more example implementations, the number and the duration of the interruptions caused by the voice SIM operation 310 can be modified to reduce the impact of these interruptions on the data SIM operations 312. The following discussion provides example mitigation techniques that can be used to reduce the impact of voice SIM operations 310 on data SIM operations 312.

Figure 4:
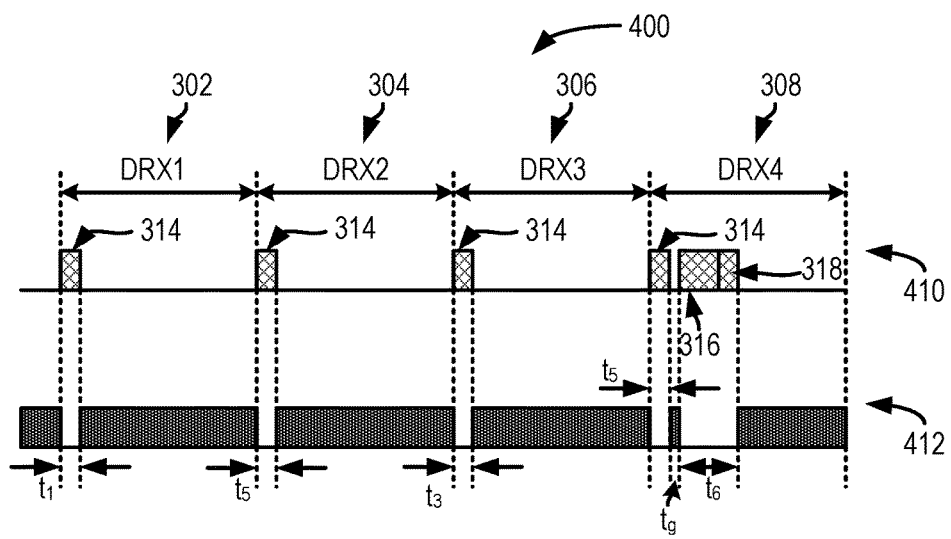
FIG. 4 depicts an example mitigation technique for reducing an impact of voice SIM operations on data SIM operations according to some examples.

FIG. 4 depicts an example mitigation technique for reducing an impact of voice SIM operations on data SIM operations. Specifically, FIG. 4 depicts a mitigation technique that increases the periodicity of cell search or measurement operations. FIG. 4 shows a set of voice SIM operations 410 and a set of data SIM operations 412 over four DRX cycles, similar to the four DRX cycles shown in FIG. 3. However, unlike the voice SIM operations 310 shown in FIG. 3, where the cell measurement operation 316 is carried out in both the second and the fourth DRX cycles 304 and 308, in the voice SIM operations 410 shown in FIG. 4, the cell measurement operation 316 is not carried out in the second DRX cycle 304. Instead the cell measurement operation 316 is carried out in the fourth DRX cycle 308. By carrying out the cell measurement operation 316 in every fourth DRX cycle instead of every second DRX cycle, the periodicity of the cell measurement operation 316 is increased two-fold. As a result, the interruptions in the data SIM operations 412 are reduced in half. It is understood that the periodicity of the cell measurement operations can be increased by 3, 4, or more times. In some instances, increasing the periodicity of the cell measurement operations 316 may increase the risk of being disconnected from the currently serving cell. However, under good cell conditions and with low mobility, these risks may be substantially low. As such, using the above mitigation technique, the disruptions in the data SIM operations 412 can be reduced while still maintaining communication over the serving cell.

In some example implementations, such as the one shown in FIG. 4, a time gap can be introduced between the completion of the page monitoring operation 314 and the beginning of the cell measurement operation 316. Specifically, the RF chain can be allocated to perform the page monitoring operation 314 for time $t_5$. At the end of time $t_5$, a time gap $t_g$ can be introduced. During this time gap $t_g$, the RF chain can be reallocated to performing data SIM operations 412. After the time gap $t_g$, the RF chain can again be reallocated to the voice SIM operations 410 to complete the cell measurement operation 316 and the cell reselection operation 318 for about time $t_6$. By allowing the RF chain to be reallocated to perform data SIM operations 412, the data SIM can have some recovery time in between two interruptions from voice SIM operations 412. In some instances, long gaps in data SIM operations 410 can can have an impact on the performance of data SIM operations 410. During the time gap, the RF chain can, for example, re-establish, or reduce the risk or losing, one or more data connections used for communicating data during the data SIM operations 410. In some other example implementations, however, the time gap may be absent, such that the cell measurement operation 316 and the cell reselection operation 318 may be immediately performed after the page monitoring operation 314 without reallocating the RF chain to performing data SIM operations 412.

Figure 5:
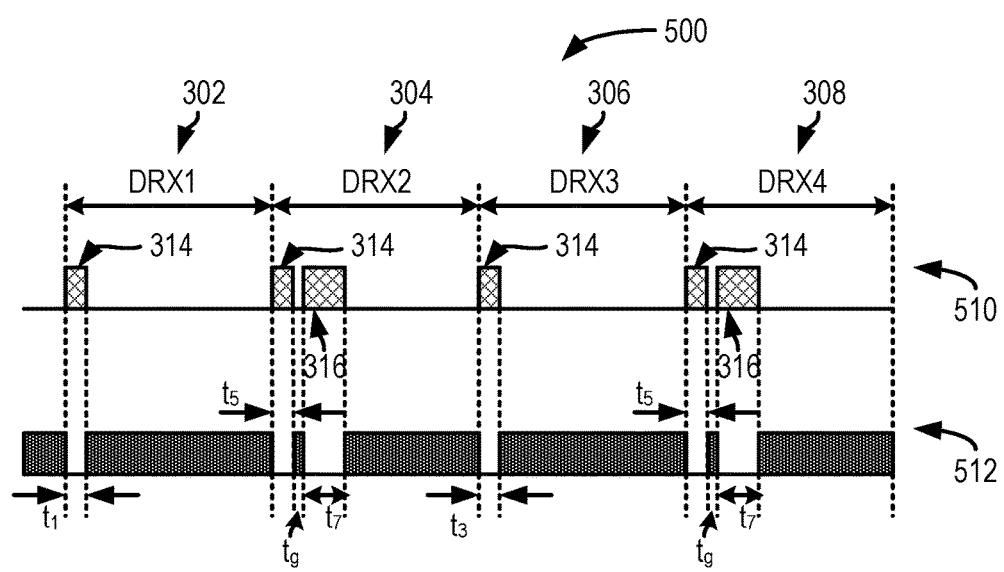
FIG. 5 depicts another example mitigation technique for reducing an impact of voice SIM operations on data SIM operations according to various examples.

FIG. 5 depicts another example mitigation technique for reducing an impact of voice SIM operations on data SIM operations. Specifically, FIG. 5 depicts a mitigation technique that limits the number of voice SIM operations in a DRX cycle. FIG. 5 shows a set of voice SIM operations 510 and a set of data SIM operations 512 over four DRX cycles, similar to the four DRX cycles shown in FIG. 3. However, unlike the voice SIM operations 310 shown in FIG. 3, where both the cell measurement operation 316 and the cell reselection operations 318 were carried out in the fourth DRX cycle 308, the mitigation technique shown in FIG. 5, limits the number of voice SIM operations to only the page monitoring operation 314 and the cell measurement operation 316. By limiting the number of operations in the fourth DRX cycle 308 to the page monitoring operation 314 and the cell measurement operation 316, the data SIM operations 512 are interrupted for a duration of $t_5+t_7$, which is less than the duration $t_4$ in the fourth DRX cycle 308 shown in FIG.

3. The cell reselection operation 318 may instead be carried out in a subsequent DRX cycle. In some example implementations, the wireless communication device 200 may only impose a limit on the cell search/measurement/reselection operations instead of the total number of operations. For example, wireless communication device 200 may not impose a limit on the page monitoring operation 314, but instead only limit the number of cell search/measurement/reselection operations to a specified number. As discussed above in relation to FIG. 4, the RF chain can be reallocated to performing data SIM operations 412 for a time gap $t_g$ between the page monitoring operation 314 and the cell measurement operation 316. In some example implementations, the time gap $t_g$ may be removed, while still reducing the overall time for which the data SIM operations 412 are interrupted.

In some other example implementations, the number of voice SIM operations 510 may be limited based on a duration limit. For example, if the total duration of normally scheduled voice SIM operations during a DRX cycle exceed the duration limit, the wireless communication device 200 may limit the number of voice SIM operations such that the total duration of the reduced number of voice SIM operations is below the duration limit. In one or more example implementations, the duration limit can be experimentally or analytically determined to keep the interruptions to the data SIM operations 512 to within desirable limits. In one or more example implementations, the duration limit may be determined to reduce the risk of the wireless communication device 200 being disconnected from the RAT over which the data SIM operations 512 are communicated. For example, in one or more examples, the impact on data bandwidth and/or connectivity may increase non-linearly with the interruption duration. That is, the impact increases at a much faster rate than a corresponding rate of increase in the interruption duration. In some such examples, it can be beneficial to set the duration limit to levels that result in tolerable impact on the data bandwidth and/or connectivity.

In some other example implementations, another way of imposing a duration limit on the number of voice SIM operations 510 can be to limit the types of voice SIM operations that can be performed during a single DRX cycle. In one or more example implementations, the wireless communication device 200 may perform only one of cell measurement/reselection operations and other voice SIM operations. For example, referring to FIG. 5, the wireless communication device 200 may perform only one of the page monitoring operation 314 and the cell measurement operation 316 in the second and fourth DRX cycles 304 and 308. By performing only one type of operation during a DRX cycle, the duration for which the RF chain is allocated to perform voice SIM operations can be reduced, thereby reducing the duration of interruption to data SIM operations. In some example implementations, the wireless communication device 200 may perform cell measurement and cell reselection operations separately from other idle mode operations. For example, the wireless communication device 200 may perform cell measurement or cell reselection operations in one DRX cycle, but refrain from performing other idle mode operations such as acquiring system information operations during the same DRX cycle. By separating the cell measurement/cell reselection operations from other idle mode operations, the duration for which the data SIM operations are interrupted can be reduced.

In some example implementations, another mitigation technique can include skipping executing cell measurement operations if the serving cell provides good channel conditions. Under some communication standards, such as LTE, carrier frequencies of the serving cell and that of the neighboring cell are assigned reselection priority levels. Normally, based on these reselection priority levels and the signal strength of the serving cell, the wireless communication device 200 may begin performing cell measurements operations on the neighboring cells. For example, the wireless communication device 200 can perform cell measurement operations on neighboring cells having higher priority than the priority of the serving cell. However, in some example implementations, the neighboring cells may be assigned with higher priority than the serving cell mainly for load balancing purposes, rather than for performance improvements. In some such example implementations, if the serving cell is in good channel conditions, cell measurement operations on the higher priority neighboring cells can be skipped without appreciably affecting performance. In such instances, the wireless communication device 200 can skip executing cell measurement operations. By refraining from performing cell measurement operations, interruptions in the data SIM operations can be avoided. The wireless communication device 200 may continue to monitor the neighboring cells to ensure good mobility performance, while continuing to regard higher priority neighboring cells as having priorities equal to the priority of the serving cell. The wireless communication device 200 can consider the serving cell as providing good channel conditions based on page monitoring operations or based on channel quality indicators such as pilot strength, signal-to-noise ratio (SNR), reference signal received quality (RSRQ), and other measurable channel parameters that can indicate the condition of the channel. For example, if the wireless communication device 200 is able to successfully receive and decode the paging messages received from the serving cell, then this can indicate that the serving cell is in good channel conditions. In addition, the pilot strength, the SNR, and the RSRQ exceeding respective predetermined thresholds also can indicate good channel conditions.

In one or more example implementations, another mitigation technique can include skipping executing cell reselection operations to a different RAT if the serving cells provides good channel conditions. In some example implementations, for voice operations, selecting a RAT with a priority level that is higher than the priority level of the serving RAT may not necessarily provide improvements in voice call quality. Therefore, if the serving RAT is under good channel conditions as discussed above, the wireless communication device may refrain from reselecting to a different RAT. The wireless communication device 200 may continue to reselect to a different RAT if the serving RAT is under poor channel condition to ensure good mobility performance.

In one or more example implementations, another mitigation technique can include changing the priority levels of the serving cell frequency to reduce the probability of occurrence of a cell measurement operation and a cell reselection operation. The wireless communication device 200 may receive from the serving cell reselection priorities associated with various frequencies within the serving cell as well as in neighboring cells (which may be the same as or different from the serving RAT). As briefly mentioned above, the wireless communication device 200 may perform cell measurement and reselection operations based on the reselection priority of the serving cell in relation to the neighboring cell. For example, if the reselection priority of a neighboring cell is greater than the reselection priority of the serving cell, then the wireless communication device 200 performs cell measurement operations on the neighboring cell. However, if the reselection priority of a neighboring cell is equal to or lower than the reselection priority of the serving cell, then performing the cell measurement operations may be based on the signal strength of the serving cell frequency in relation to a threshold value. Thus, if the wireless communication device 200 encounters a neighboring cell having a reselection priority that is greater than the reselection priority of the serving cell, the wireless communication device 200 would perform a cell measurement operation, thereby interrupting the data SIM operations. But if the wireless communication device 200 were to change the reselection priority of the serving cell to be greater than the reselection priority of all neighboring cells, then the cell measurement operations would have to be performed only when the signal strength of the serving cell frequency is less than a threshold value. As a result, by changing the reselection priority of the serving cell to be greater than the reselection priority of the neighboring cells, the number of cell measurement operations, and thereby interruptions to data SIM operations, can be reduced.

In one or more example implementations, another mitigation technique can include exhausting measuring and/or reselecting frequencies within the serving RAT before measuring and/or reselecting frequencies for other RATs. In some example implementations, the time needed for measuring and/or reselecting another frequency within the serving RAT may be less than that needed for measuring and/or reselecting frequencies in a different RAT. By limiting the wireless communication device 200 to measure and/or reselect frequencies within the serving RAT prior to measuring and/or reselecting frequencies in the neighboring RAT, the duration of interruptions to the data SIM operations can be reduced.

In one or more example implementations, the wireless communication device 200 may modify the reselection priorities such that the reselection priorities of all frequencies within the serving cell are greater than the reselection priority of any frequency in other RATs. This change in reselection priorities can result in the wireless communication device 200 to measure and/or reselect frequencies within the serving cell before measuring and/or reselecting frequencies in a neighboring RAT.

In one or more example implementations, yet another mitigation technique can include performing a search for suitable frequencies within the serving RAT prior to switching to a different RAT. Specifically, this technique can be implemented in instances where a switch to a different RAT has already been triggered. However, prior to actually executing the switching operation, the wireless communication device 200 can perform a search for a suitable frequency within the serving RAT. If a suitable frequency within the serving RAT is found, the wireless communication device 200 may abort the switch to the different RAT, and instead switch to the suitable frequency within the service RAT. As the time needed to execute a switch to a different RAT is relatively longer than that to execute a switch to a different frequency within the serving RAT, the duration for which the data SIM operations are interrupted can be reduced.

In one or more example embodiments, yet another mitigation technique can include changing measurement thresholds used during cell measurement operations. As mentioned above, the signal strength of the serving cell frequency is one of the factors that are considered in performing a cell measurement operation. In particular, if the signal strength of the serving cell is greater than a threshold value, then the wireless communication device 200 may choose not to perform any cell measurement operations. By decreasing the threshold value, the probability of the event that the signal strength of the serving cell frequency is equal to or below the threshold value is reduced. Thus, over time, the number of times the cell measurement operation may have to be performed can be reduced, thereby reducing the duration of the interruptions to the data SIM operations.

In one or more example implementations, the above mentioned mitigation techniques may be performed if one or more conditions are met. For example, these conditions can include: (1) the first SIM 204a is performing data call operations, (2) the second SIM 204b is performing voice SIM operations in idle mode, and (3) the serving cell used by the second SIM 204b exhibits reasonable channel conditions. In one or more example implementations, whether the serving cell used by the second SIM 204b to carry out voice SIM operations exhibits reasonable channel conditions can be determined based on page monitoring operations or based on channel quality indicators such as pilot strength, signal-to-noise ratio (SNR), reference signal received quality (RSRQ), and other measurable channel parameters that can indicate the condition of the channel. With regards to page monitoring operations, for example, the wireless communication device 200 can monitor a paging channel (PCH) of the serving cell (e.g., LTE and GSM) to receive paging messages. These paging messages can be decoded, and the decoded information can be used by the wireless communication device 200 to determine, for example, an incoming voice call. As another example, the wireless communication device 200 can monitor a page indicator channel of the serving cell (e.g., WCDMA/UMTS) to receive page indicators which indicate whether the wireless communication device should check the next secondary common control physical channel (SCCPH) for paging messages. If the wireless communication device 200 is able to successfully receive and decode the paging messages received from the serving cell, then this can indicate that the serving cell is in a reasonable channel condition. In one or more example implementations, failure to receive a set number of paging messages or failure to decode the paging messages can indicate that the serving channel is not under reasonable channel conditions. In addition, the pilot strength, the SNR, and the RSRQ exceeding respective predetermined thresholds also can indicate reasonable channel conditions. In one or more example implementations, the wireless communication device may implement one or more of the mitigation techniques discussed above only if all of the aforementioned three conditions are met.

Figure 6:
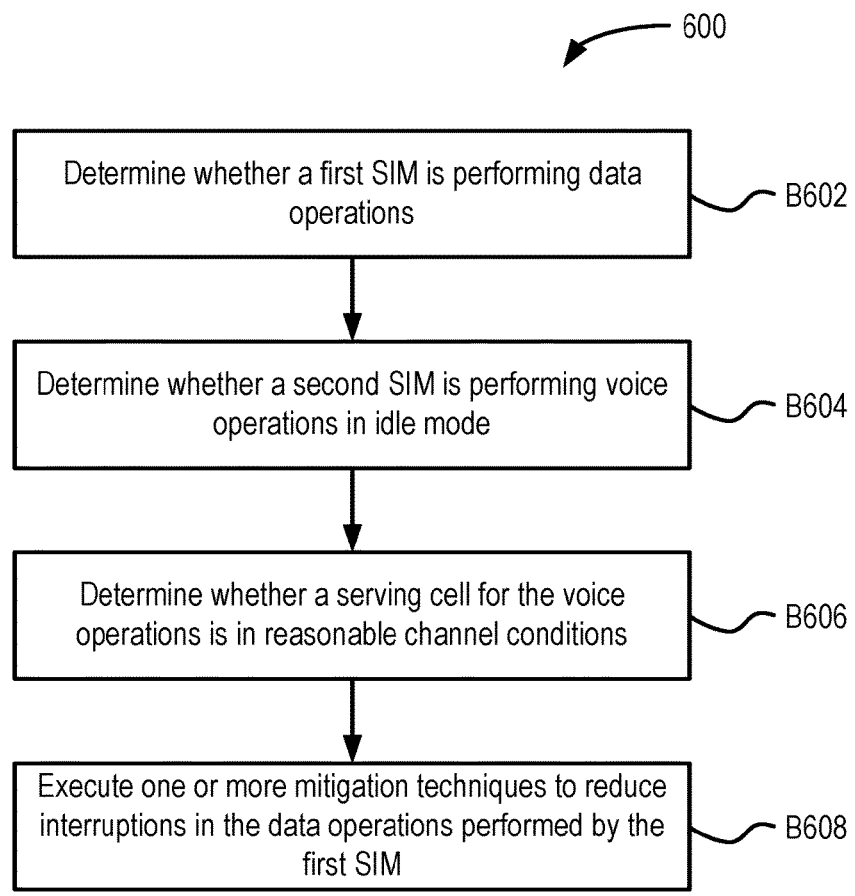
FIG. 6 depicts a process flowchart diagram of a method for implementing one or more mitigation techniques for reducing interruptions in data SIM operations according to various examples.

FIG. 6 depicts a process flowchart diagram of a method 600 for implementing one or more mitigation techniques for reducing interruptions in data SIM operations. The method 600 includes determining whether a first SIM is performing data operations (B602), determining whether a second SIM is performing voice operations in idle mode (B604), determining whether a serving cell for the voice operations is providing reasonable channel conditions (B604), and executing one or more mitigation techniques to reduce interruptions in the data operations performed by the first SIM. The method 600 may be performed by one or more of the baseband modem processor 216, the general-purpose processor 206 and the scheduling module 230, of the wireless communication device 200 discussed above in relation to FIG. 2.

At block B602, the wireless communication device 200 determines whether the first SIM is performing data operations. As discussed above in relation to FIG. 2, the first SIM 204a is capable of supporting data communications. These data communication are carried out over a RAT that supports data operations suitable for supporting data applications running on the wireless communication device. In one example, the wireless communication device 200 may check whether a data application is currently running to determine whether the first SIM 204a is performing data operations. In some other example implementations, the wireless communication device 200 may check whether the first SIM 204a is in a data call. In yet other example implementations, the wireless communication device 200 may check whether the first SIM 204a is in an RRC connected state to determine whether the first SIM 204a is performing data operations.

At block B604 the wireless communication device 200 determines whether the second SIM is performing voice operations in idle mode. As discussed above in relation to FIG. 2, the second SIM 204b is capable of supporting voice communications. In one example implementation, the wireless communication device 200 can determine that the second SIM is performing voice operations in idle mode by determining that the second SIM is not currently in a voice call. In some other example implementations, the wireless communication device 200 can determine the status of connection between the wireless communication device 200 and the serving cell. For example, an idle connection status (e.g., RRC_IDLE state) can indicate that the second SIM is in the idle mode.

At block B606 the wireless communication device 200 determines whether a serving cell for the voice operations is in reasonable channel conditions. As discussed above, wireless communication device 200 may determine reasonable channel conditions based on monitoring a paging channel of the serving cell or based on channel quality indicators such as pilot strength, signal-to-noise ratio (SNR), reference signal received quality (RSRQ), and other measurable channel parameters that can indicate the condition of the channel. For example, successful receipt and/or decoding of paging messages received from the serving cell can indicate reasonable channel conditions. Further, the pilot strength, the SNR, and the RSRQ exceeding respective predetermined thresholds also can indicate reasonable channel conditions. It is understood that the wireless communication device 200 may execute blocks B602, B604, and B606 in any order or simultaneously.

At block B608, if the determinations made by the wireless communication device 200 in blocks B602, B604, and B606 are successful, one or more mitigation techniques to reduce interruptions in the data operations performed by the first SIM can be executed. Several mitigation techniques have been discussed above. For example, as discussed above in relation to FIG. 4, one mitigation technique can include increasing the periodicity of cell search or measurement operations. Another mitigation technique can include limiting the number of voice SIM operations within a DRX cycle, as discussed in relation to FIG. 5. Yet another mitigation technique includes limiting the number of voice SIM operations based on a duration limit, as also discussed above in relation to FIG. 5. An additional mitigation technique can include limiting the types of voice SIM operations that can be performed within a single DRX cycle. An additional mitigation technique can include separating cell measurement/cell reselection operations from other idle mode operations. Another mitigation technique can include skipping executing cell measurement and/or reselection operations if the serving cell provides good channel conditions. In yet another mitigation technique, reselection priority levels of serving cell frequencies can be changed to reduce the probability of occurrence of a cell measurement and/or a cell reselection operation. In an additional mitigation technique, reselection priorities can be modified such that the wireless communication device 200 exhausts measuring and/or reselecting frequencies within the serving RAT before measuring and/or reselecting frequencies for a different RAT. Another mitigation technique can include performing a search for suitable frequencies within the serving RAT prior to switching to a different RAT. Yet another mitigation technique can include changing measurement thresholds used during cell measurement operations to reduce the probability of triggering a cell reselection. It is understood that the wireless communication device 200 may simultaneously execute one or more mitigation techniques discussed above.

In one or more example implementations, the method 600 may also include monitoring the conditions determined in blocks B602, B604, and B606, and terminating the execution of the one or more mitigation techniques if one or of the determinations are unsuccessful. In one or more such examples, the wireless communication device 200 may terminate the execution of mitigation techniques of any one of the determinations made in blocks B602, B604, and B606 are unsuccessful.

Figure 7:
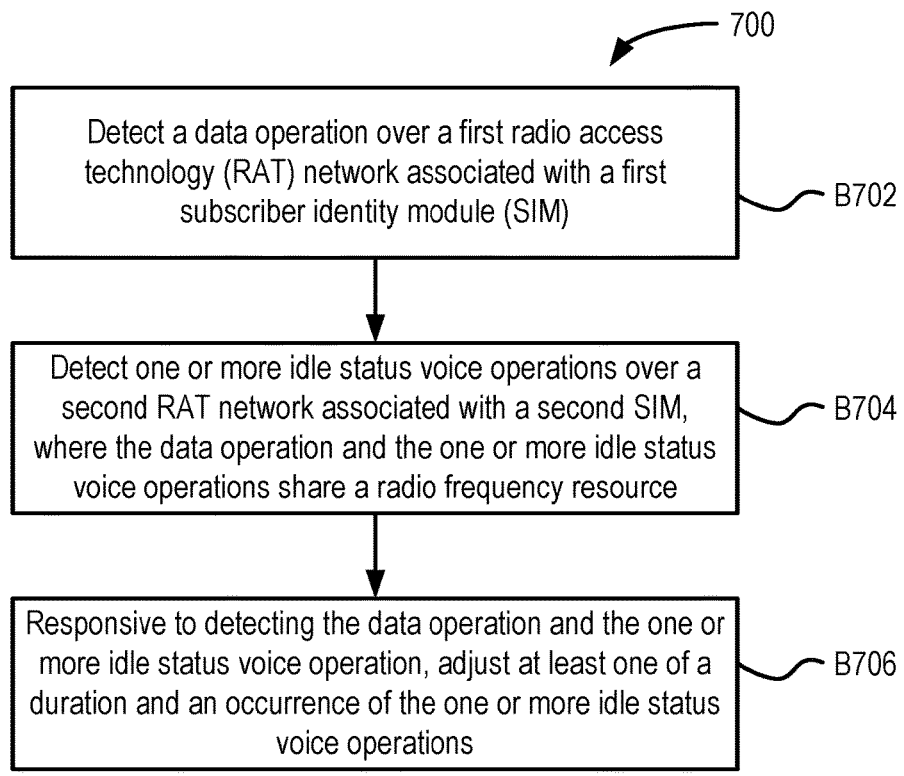
FIG. 7 depicts a process flowchart diagram of another method for implementing one or more mitigation techniques for reducing interruptions in data SIM operations according to various examples.

FIG. 7 depicts a process flowchart diagram of another method 700 for implementing one or more mitigation techniques for reducing interruptions in data SIM operations. The method 700 includes detecting a data operation over a first radio access technology (RAT) network associated with a first subscriber identity module (SIM) (B702). The method 700 further includes detecting one or more idle status voice operations over a second RAT network associated with a second SIM, where the data operation and the one or more idle status voice operations share a radio frequency (RF) resource (B704). The method 700 also includes responsive to detecting the data operation and the idle status voice operation, adjusting at least one of a duration and an occurrence of the one or more idle status voice operations (B706). The method 600 may be performed by one or more of the baseband modem processor 216, the general-purpose processor 206 and the scheduling module 230, of the wireless communication device 200 discussed above in relation to FIG. 2.

At block B702, the wireless communication device 200 detects a data operation over a first audio access technology (RAT) network associated with a first SIM. As discussed above in relation to FIG. 2, the first SIM 204a is capable of supporting active data exchange for a data call and/or for supporting a data session. The wireless communication device 200 can detect data operations associated with the active data exchange and/or data sessions. In one example, the wireless communication device 200 may check whether a data application is currently running to determine whether the first SIM is performing data operations.

At block B704, the wireless communication device 200 detects one or more idle status voice operations over a second RAT network associated with a second SIM. As discussed above in relation to FIG. 2, the second SIM 204b can support voice call operations, including operations such as page monitoring, cell measurements, cell selection, cell reselection, acquire system information, etc., when the second SIM is in an idle mode. In one example implementation, the wireless communication device 200 can determine that the second SIM is performing voice operations in idle mode by determining that the second SIM is not currently in a voice call. In some other example implementations, the wireless communication device 200 can determine the status of connection between the wireless communication device 200 and the serving cell. For example, an idle connection status (e.g., RRC_IDLE state) can indicate that the second SIM is in the idle mode.

At block B706, the wireless communication device 200, in response to detecting the data operation and the idle status voice operation, adjusting at least one of a duration and an occurrence of the one or more idle status voice operations. The wireless communication device 200 can adjust the duration or the occurrence of the one or more idle status voice operations by executing one or more mitigation techniques discussed above. For example, as discussed above in relation to FIG. 4, one mitigation technique can include increasing the periodicity of cell search or measurement operations. Another mitigation technique can include limiting the number of voice SIM operations within a DRX cycle, as discussed in relation to FIG. 5. Yet another mitigation technique includes limiting the number of voice SIM operations based on a duration limit, as also discussed above in relation to FIG. 5. An additional mitigation technique can include limiting the types of voice SIM operations that can be performed within a single DRX cycle. An additional mitigation technique can include separating cell measurement or cell reselection operations from other idle mode operations. Another mitigation technique can include skipping executing cell measurement and/or reselection operations if the serving cell provides good channel conditions. In yet another mitigation technique, reselection priority levels of serving cell frequencies can be changed to reduce the probability of occurrence of a cell measurement and/or a cell reselection operation. In an additional mitigation technique, reselection priorities can be modified such that the wireless communication device 200 exhausts measuring and/or reselecting frequencies within the serving RAT before measuring and/or reselecting frequencies for a different RAT. Another mitigation technique can include performing a search for suitable frequencies within the serving RAT prior to switching to a different RAT. Yet another mitigation technique can include changing measurement thresholds used during cell measurement operations to reduce the probability of triggering a cell reselection. It is understood that the wireless communication device 200 may simultaneously execute one or more mitigation techniques discussed above.

Figure 8:
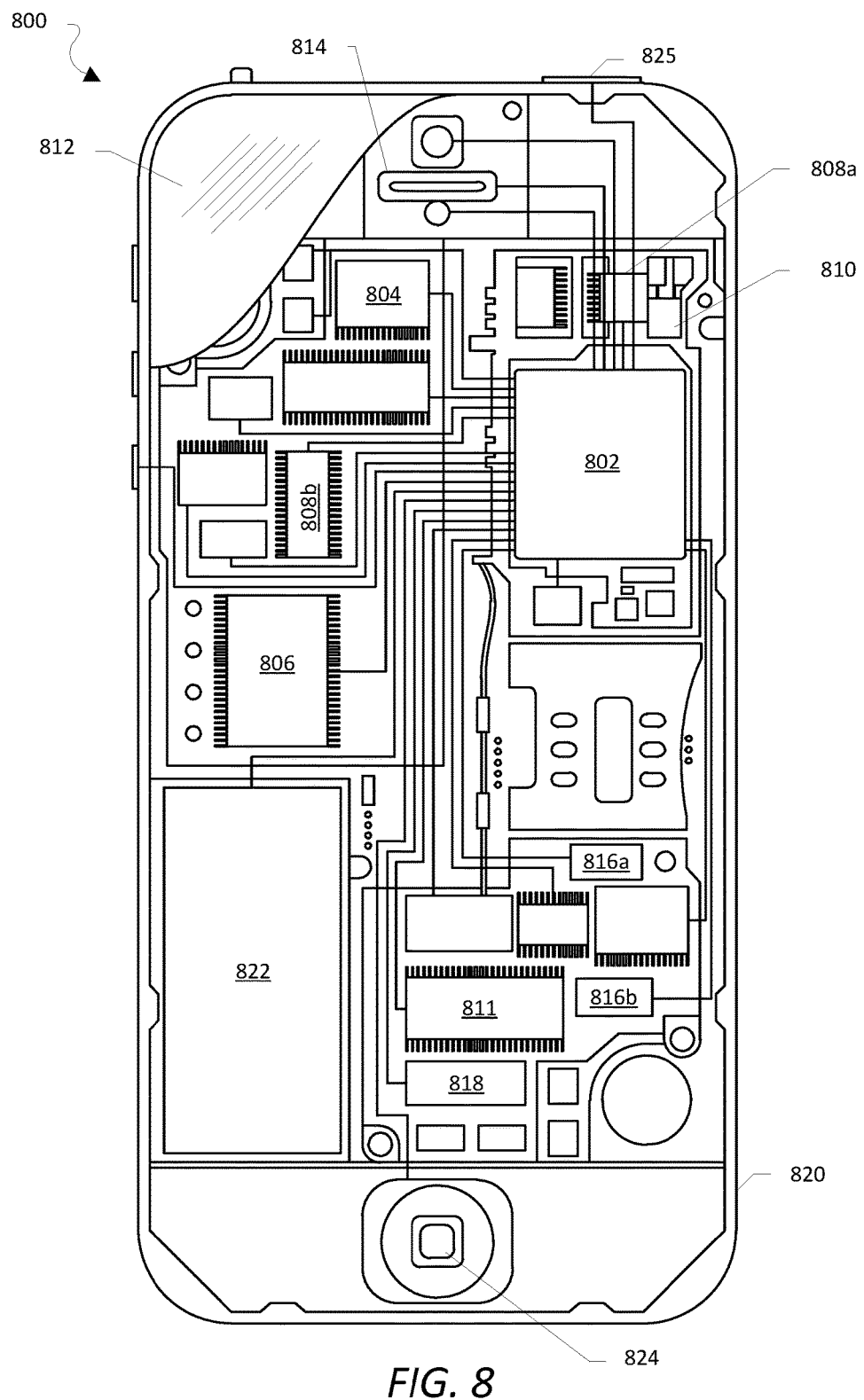
FIG. 8 is a component block diagram of a wireless communication device suitable for use with various examples.

The various examples may be implemented in any of a variety of wireless communication devices 110 and 200, an example of which is illustrated in FIG. 8, as wireless communication device 800. As such, the wireless communication device 800 may implement the process and/or the apparatus of FIGS. 1-7, as described herein.

With reference to FIGS. 1-8, the wireless communication device 800 may include a processor 802 coupled to a touchscreen controller 804 and an internal memory 806. The processor 802 may be one or more multi-core integrated circuits designated for general or specific processing tasks. The memory 806 may be volatile or non-volatile memory, and may also be secure and/or encrypted memory, or unsecure and/or unencrypted memory, or any combination thereof. The touchscreen controller 804 and the processor 802 may also be coupled to a touchscreen panel 812, such as a resistive-sensing touchscreen, capacitive-sensing touchscreen, infrared sensing touchscreen, etc. Additionally, the display of the wireless communication device 800 need not have touch screen capability.

The wireless communication device 800 may have one or more cellular network transceivers 808*a*, 808*b* coupled to the processor 802 and to at least one antenna 810 and configured for sending and receiving cellular communications. The transceivers 808*a*, 808*b* and antenna 810 may be used with the above-mentioned circuitry to implement the various example methods. The cellular network transceivers 808*a*, 808*b* may be the RF resource 218. The antenna 810 may be the wireless antenna 220. The wireless communication device 800 may include two or more SIM cards 816*a*, 816*b*, corresponding to SIM-1 204*a* (the first SIM) and SIM-2 204*b* (the second SIM), coupled to the transceivers 808*a*, 808*b* and/or the processor 802. The wireless communication device 800 may include a cellular network wireless modem chip 811 (e.g., the baseband modem processor 216) that enables communication via at least one cellular network and is coupled to the processor 802.

The wireless communication device 800 may include a peripheral device connection interface 818 coupled to the processor 802. The peripheral device connection interface 818 may be singularly configured to accept one type of connection, or multiply configured to accept various types of physical and communication connections, common or proprietary, such as USB, FireWire, Thunderbolt, or PCIe. The peripheral device connection interface 818 may also be coupled to a similarly configured peripheral device connection port (not shown).

The wireless communication device 800 may also include speakers 814 for providing audio outputs. The wireless communication device 800 may also include a housing 820, constructed of a plastic, metal, or a combination of materials, for containing all or some of the components discussed herein. The wireless communication device 800 may include a power source 822 coupled to the processor 802, such as a disposable or rechargeable battery. The rechargeable battery may also be coupled to a peripheral device connection port (not shown) to receive a charging current from a source external to the wireless communication device 800. The wireless communication device 800 may also include a physical button 824 for receiving user inputs. The wireless communication device 800 may also include a power button 826 for turning the wireless communication device 800 on and off.

The various examples illustrated and described are provided merely as examples to illustrate various features of the claims. However, features shown and described with respect to any given example are not necessarily limited to the associated example and may be used or combined with other examples that are shown and described. Further, the claims are not intended to be limited by any one example.

The foregoing method descriptions and the process flow diagrams are provided merely as illustrative examples and are not intended to require or imply that the steps of various examples must be performed in the order presented. As will be appreciated by one of skill in the art the order of steps in the foregoing examples may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the examples disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present examples.

The hardware used to implement the various illustrative logics, logical blocks, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In some exemplary examples, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed examples is provided to enable any person skilled in the art to make or use the present examples. Various modifications to these examples will be readily apparent to those skilled in the art, and the generic principles defined herein may be applied to some examples without departing from the spirit or scope of the examples. Thus, the present examples are not intended to be limited to the examples shown herein but is to be accorded the widest scope consistent with the following claims and the principles and novel features disclosed herein.

What is claimed is:

1. A method to improve data communications in a wireless communication device, comprising:
   detecting a data operation over a first radio access technology (RAT) network associated with a first subscriber identity module (SIM);
   detecting one or more idle status voice operations over a second RAT network associated with a second SIM, wherein the data operation and the one or more idle status voice operations share a radio frequency (RF) resource; and
   responsive to detecting the data operation and the idle status voice operation, adjusting at least one of a duration and an occurrence of the one or more idle status voice operations based on types of the one or more idle status voice operations being carried out during a discontinuous (DRX) cycle.

2. The method of claim 1, further comprising monitoring a paging channel of a serving cell in the second RAT network to detect a predetermined channel condition, and wherein the adjusting is further based on the predetermined channel condition.

3. The method of claim 1, further comprising reallocating the RF resource from the data operation to the at least one idle status voice operation in response to detecting the one or more idle status voice operations.

4. The method of claim 1, wherein the adjusting includes decreasing a repetition rate of a cell measurement operation.

5. The method of claim 1, wherein the adjusting includes decreasing a number of the one or more idle status voice operations during the DRX cycle.

6. The method of claim 1, wherein the adjusting includes reducing a total duration of the one or more idle status voice operations during the DRX cycle.

7. The method of claim 1, wherein the adjusting includes performing a search for suitable frequencies within a serving RAT prior to switching to a neighboring cell in a RAT network that is different from the second RAT network.

8. The method of claim 1, wherein the adjusting includes reducing a signal strength measurement threshold with which a signal strength of a serving cell frequency is compared during a cell measurement operation.

9. The method of claim 1, wherein the adjusting includes performing at least one of a cell measurement operation and a cell selection operation during the DRX cycle separately from other idle state voice operations.

10. A wireless communication device, comprising:
    a radio frequency (RF) resource configured to support a data operation over a first radio access technology (RAT) network associated with a first subscriber identity module (SIM), and to support one or more idle status voice operations over a second RAT network associated with a second SIM;
    a processor coupled to the RF resource; and
    a memory storing instructions that, when executed by the processor, cause the wireless communication device to:
       detect the data operation over the first RAT network,
       detect the one or more idle status voice operation over the second RAT network, and
       responsive to detecting the data operation and the one or more idle status voice operations, adjust at least one of a duration and an occurrence of the one or more idle status voice operations based on types of the one or more idle status voice operations being carried out during a discontinuous (DRX) cycle.

11. The wireless communication device of claim 10, wherein execution of the instructions further causes the wireless communication device to monitor a paging channel of a serving cell in the second RAT network to detect a predetermined channel condition.

12. The wireless communication device of claim 10, wherein execution of the instructions further causes the wireless communication device to reallocate the RF resource from the data operation to the at least one idle status voice operation in response to detecting the one or more idle status voice operations.

13. The wireless communication device of claim 10, wherein execution of the instructions causes the wireless communication device to adjust at least one of a duration and an occurrence of the one or more idle status voice operations by decreasing a repetition rate of a cell measurement operation.

14. The wireless communication device of claim 10, wherein execution of the instructions causes the wireless communication device to adjust at least one of a duration and an occurrence of the one or more idle status voice operations by decreasing a number of the one or more idle status voice operations during the DRX cycle.

15. The wireless communication device of claim 10, wherein execution of the instructions causes the wireless communication device processor is adapted to adjust at least one of a duration and an occurrence of the one or more idle status voice operations by reducing a total duration of the one or more idle status voice operations during the DRX cycle.

16. The wireless communication device of claim 10, wherein execution of the instructions causes the wireless communication device to adjust at least one of a duration and an occurrence of the one or more idle status voice operations by performing a search for suitable frequencies within a serving cell prior to switching to a neighboring cell in a RAT network that is different from the second RAT network.

17. The wireless communication device of claim 10, wherein execution of the instructions causes the wireless communication device to adjust at least one of a duration and an occurrence of the one or more idle status voice operations by reducing a signal strength measurement threshold with which a signal strength of a serving cell frequency is compared during a cell measurement operation.

18. The wireless communication device of claim 10, wherein execution of the instructions causes the wireless communication device to adjust at least one of a duration and an occurrence of the one or more idle status voice operations by performing at least one of a cell measurement operation and a cell selection operation during a discontinuous reception cycle (DRX) separately from other idle state voice operations.

19. A method to improve data communications in a wireless communication device, comprising:

detecting a data operation over a first radio access technology (RAT) network associated with a first subscriber identity module (SIM);

detecting one or more idle status voice operations over a second RAT network associated with a second SIM, wherein the data operation and the one or more idle status voice operations share a radio frequency (RF) resource; and responsive to detecting the data operation and the idle status voice operation, adjusting at least one of a duration and an occurrence of the one or more idle status voice operations by:
  skipping cell measurement operations if a serving cell provides a predetermined channel condition;
  skipping cell reselection operations to a different RAT network from the second RAT network if a serving cell provides a predetermined channel condition;
  adjusting a reselection priority level associated with a serving cell frequency to be greater than or equal to a reselection priority associated with a neighboring cell frequency; or
  increasing reselection priorities of all frequencies in a serving RAT to be greater than or equal to a reselection priority of any frequency of a non-serving RAT.

20. A wireless communication device, comprising:

a radio frequency (RF) resource configured to support a data operation over a first radio access technology (RAT) network associated with a first subscriber identity module (SIM), and to support one or more idle status voice operations over a second RAT network associated with a second SIM;

a processor coupled to the RF resource; and a memory storing instructions that, when executed by the processor, cause the wireless communication device to:

detect the data operation over the first RAT network, detect the one or more idle status voice operation over the second RAT network, and responsive to detecting the data operation and the one or more idle status voice operations, adjust at least one of a duration and an occurrence of the one or more idle status voice operations by:
  skipping cell measurement operations if a serving cell provides a predetermined channel condition;
  skipping cell reselection operations to a different RAT network from the second RAT network if a serving cell provides a predetermined channel condition;
  adjusting a reselection priority level associated with a serving cell frequency to be greater than or equal to a reselection priority associated with a neighboring cell frequency; or
  increasing reselection priorities of all frequencies in a serving RAT to be greater than or equal to a reselection priority of any frequency of a non-serving RAT.

\* \* \* \* \*